United States Patent [19]

Roza

[11] Patent Number: 4,815,102
[45] Date of Patent: Mar. 21, 1989

[54] CLOCK GENERATION IN A TRANSMISSION SYSTEM HAVING A STRONG BANDWIDTH LIMITATION

[75] Inventor: Engel Roza, Eindhoven, Netherlands

[73] Assignee: U.S. Philips Corporation, New York, N.Y.

[21] Appl. No.: 107,624

[22] Filed: Oct. 9, 1987

[30] Foreign Application Priority Data

Oct. 20, 1986 [NL] Netherlands ............. 8602626

[51] Int. Cl.⁴ ........................................... H04L 25/60
[52] U.S. Cl. ........................................... 375/4; 375/120
[58] Field of Search .................. 375/3, 4, 110, 120;
455/601; 379/338; 370/26

[56] References Cited

U.S. PATENT DOCUMENTS

| | | | |
|---|---|---|---|
| 2,627,574 | 2/1953 | Feldman | 375/4 |
| 3,493,868 | 2/1970 | Hackett, Jr. | 375/110 |
| 3,993,952 | 11/1976 | Roza | 375/4 |
| 4,251,886 | 2/1981 | Roza | 375/18 |
| 4,276,650 | 6/1981 | deJager et al. | 375/110 |
| 4,704,722 | 11/1987 | Henry | 375/120 |

*Primary Examiner*—Robert L. Griffin
*Assistant Examiner*—Stephen Chin
*Attorney, Agent, or Firm*—Thomas A. Briody; Jack E. Haken; Anne E. Barschall

[57] ABSTRACT

A clock generator for a pulse repeater of a receiver in a pulse transmission system comprises a forward filter (1) connected to its input (A), a difference former (2) whose positive input is connected to the output of the forward filter (1), a series arrangement connected between the output of the difference former (2) and the output (B) of the clock pulse generator and comprising a limiter (3), a time differentiator (4), a rectifier (5) and a narrow bandpass filter (10) in this order, and a feedback filter (6) connected between the output of the limiter (3) or the rectifier (5) and the negative input of the difference former (2). The limiter (3) is used to cancel intersymbol interference. The clock generator can be utilized in combination with a known pulse signal regenerator (1,7-9) of the decision feedback type to constitute a pulse repeater. Alternatively, a pulse repeater can be obtained by combining the clock generator with only a pulse regenerator (8, FIG. 2) whose clock input is connected to the output (B) of the clock generator, whose signal input is connected to the output of the rectifier (5) of the clock generator and whose output constitutes the output (c) of the pulse repeater.

9 Claims, 3 Drawing Sheets

CLOCK GENERATION IN A TRANSMISSION SYSTEM HAVING A STRONG BANDWIDTH LIMITATION

BACKGROUND OF THE INVENTION

1. Field of the Invention

The invention relates to a clock generator for a pulse repeater of a receiver in a pulse transmission system.

2. Prior Art

A clock generator of this type is known from the U.S. Pat. No. 4,251,886. The clock generator of this publication is included in a pulse repeater of a receiver in a pulse transmission system more specifically having transmission channels with a very strong bandwidth limitation, i.e. a bandwidth smaller than the Nyquist frequency of the pulse signals, which type of transmission system the invention is aimed at.

The problem of pulse synchronization in these pulse transmission systems is solved by co-transmitting in the pulse signal band a pilot signal which is derived via a fixed relationship from the pulse repetition frequency and which can be reconverted thereto. In the known clock regenerator, use is made of a pilot signal superposed on the transmitted pulse signal to generate clock pulses in the pulse repeater which are applied to the clock input of one or more pulse regenerators.

When employing the known techniques, the use of a pilot signal is compulsory as it is not possible with the known techniques to recover the clock pulses from the transmitted pulse signal itself, because with these techniques the clock information is recovered from the part of the signal spectrum lying around the Nyquist frequency and this part of the signal spectrum has already been suppressed in case of a transmission channel having a strong bandwidth limitation.

In synchronization techniques using pilot signals, strict requirements are made on filters which have to separate the pilot signal from the information signal, the transmitted pulse signal. In addition, this type of clock recovery is strongly dependent on the real random nature of the information signal as each spectral line in the neighbourhood of the frequency of the pilot signal may cause erroneous synchronization. Consequently, when tests and measurements are carried out, due care should be taken and pseudo-random sequences of very great word length should be used, which sequences have to be generated especially for this purpose.

In addition, in non-linear transmission channels it is not even possible to superpose a pilot signal on the information signal; for example this is the case with digital magnetic recording or modulation of a non-linear laser.

SUMMARY OF THE INVENTION

The invention has for its object to provide a synchronization technique allowing recovery of the clock signal from the transmitted pulse signal itself even in the case of transmission channels having a strongly limited bandwidth, as a result of which cock signals can yet be generated without superpositioning a pilot signal on the pulse signal.

The invention provides a clock generator of the type set forth in the Field of the Invention, characterized in that the clock generator comprises a forward filter connected to its input, a difference former whose positive input is connected to the output of the forward filter, a series arrangement connected between the output of the difference former and the output of the clock generator and comprising a limiter, a time differentiator, a rectifier and a bandpass filter is this order, and a feedback filter connected between the output of the limiter or of the rectifier and the negative input of the difference former. The invention is further characterized in that the absolute threshold value of the limiter is smaller than the amplitude of the signal pulse response of the forward filter at the instant from where the signal pulse responses of the forward filter and the feedback filter are equal, but is larger than the amplitude of the signal pulse response of the forward filter at the instant preceding the aforesaid instant by a time interval equal to the inverse of the pulse repetition frequency if the aforesaid instant lies after the beginning of the signal pulse response of the forward filter, and at any rate exceeds zero.

By using in the proposed clock generator a new synchronisation technique, which utilizes the quantized feedback (or decision feedback) principle known per se, even in pulse transmission systems having a strong bandwidth limitation clock signals can be generated from the received pulse signals themselves.

The proposed clock generator can replace the clock generator in the pulse repeater known from the aforesaid publication, in which case the forward filter of the pulse signal regenerator (likewise comprising a difference former, a feedback filter and a pulse regenerator) may also act as the forward filter for the proposed clock generator and the pilot signal generator at the transmitter is redundant. Needless to observe that also a separate, different forward filter may be provided for the suggested clock generator, in which case the pulse responses of the respective feedback filters necessarily differ.

In an advantageous embodiment of the invention, a pulse repeater can be obtained by adding a pulse regenerator to the proposed clock generator, in which embodiment the output of the rectifier is connected to the signal input of the pulse regenerator and by means of the bandpass filter to the clock input of the pulse regenerator and the fully regenerated received pulse signal appears at the output of the pulse regenerator. This embodiment is advantageous in that the time delay caused by the pulse regenerator itself does not play any part because the pulse regenerator is not included in the feedback loop. In the opposite case, the pulse regenerator causes an additional time delay being at least equal to half the inverse of the pulse repetition frequency.

BRIEF DESCRIPTION OF THE DRAWING

The invention will now be further explained with reference to the drawing, in which.

DETAILED DESCRIPTION OF THE PREFERRED EMBODIMENTS

Figure 1:
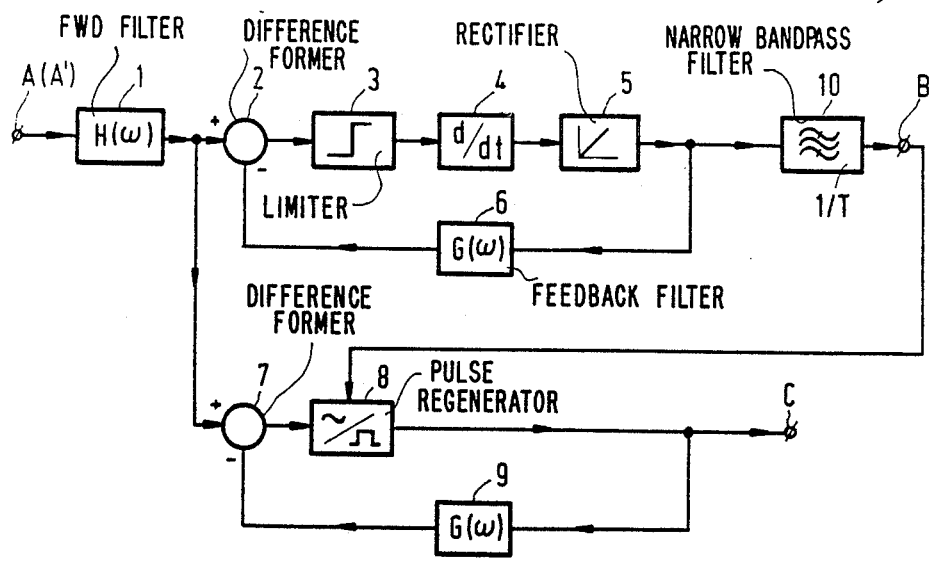
FIG. 1 shows a block diagram of a pulse repeater comprising a clock generator according to the invention.

In FIG. 1 a pulse repeater is shown which comprises a novel clock generator and a known pulse signal regenerator. The proposed clock generator will be specified first. The input and output of the clock generator are indicated by A and B, respectively. The proposed clock pulse generator comprises a forward filter 1, whose passband lies entirely within the bandwidth of the transmission channel (not shown) to which input A is connected. The output of the forward filter 1 is connected to the positive input of a difference former 2, whose output is connected to an input of a limiter 3, whose output is connected to the input of a timer differentiator 4, whose output is connected to the input of a rectifier 5, whose output is connected to the output B of the clock generator via a narrow bandpass filter 10. To provide for quantized feedback (decision feedback) a feedback filter 6 is connected between the output of the rectifier 5 and the negative input of the difference former 2. Alternatively, the feedback filter 6 can be connected to the output of the limiter 3 instead of to the output of the rectifier 5. The bandpass filter 10 can be followed by a pulse shaper (not shown) to produce clock pulses of a prescribed shape.

The pulse signal regenerator comprises an input A', which in the embodiment shown is the same as the input A of the clock generator, and an output C. A forward filter, which in the embodiment shown is the forward filter 1 of the clock generator, is connected to the input A' of the pulse signal regenerator. It should be observed that the pulse signal regenerator may comprise a separate forward filter, possibly being dimensioned differently. The pulse signal regenerator further comprises a difference former 7 whose positive input is connected to the output of the forward filter 1 and a pulse regenerator 8 connected between the output of the difference former 7 and the output C of the pulse signal regenerator. Finally, the pulse signal regenerator comprises a feedback filter 9 connected between the output C of the pulse signal regenerator and the negative input of the difference former 7.

For prescriptions as to the dimensioning of the forward filters 1 and feedback filters 6 and 9 reference is made to the aforementioned U.S. patent. The signal pulse responses of the feedback filters 6 and 9 can be chosen to be equal.

It should be observed that despite the fact that in FIG. 1 a receiver having a quantized feedback (decision feedback) is taken as an example, this is not a necessity for the application of the invention.

The operation of the clock generator 1-6 is as follows: the forward filter 1 receives pulses from a pulse transmission channel (not shown) and forms a pulse having a strong dispersive character indicated in FIG. 3A by h(t). The output signal of the forward filter 1 is limited by limiter 3. The output signal of the limiter 3 is time-differentiated by differentiator 4, rectified by rectifier 5 and applied with some delay to the feedback filter 6 producing a pulse response whose tail is equal to the tail of the pulse response of the forward filter 1. The (polarity) inverses of the pulses produced by the feedback filter 6 are represented in FIG. 3A as −g(t).

Figure 3A:
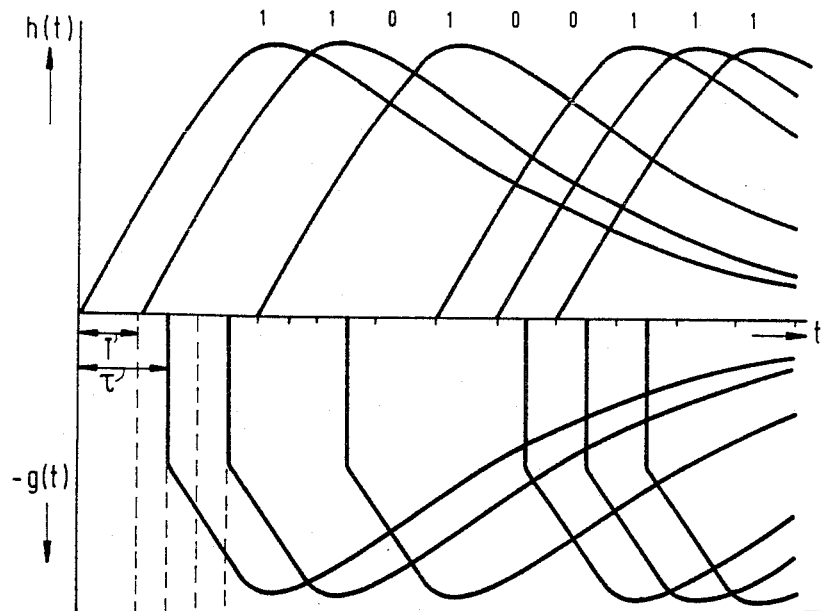
FIGS. 3A to 3D show examples of the signals occurring in the clock generator according to FIG. 1, on the basis of which the operation of the diagram according to FIGS. 1 and 2 will be explained.

In FIG. 3A it is assumed that the sequence of signal pulses applied to input A of the clock generator 1-6, 10 can be represented by 110100111, as shown in the top half of FIG. 3A. (The 1 represents a pulse occurring in the bit interval and the 0 represents the absence of a pulse in the bit interval, the bit interval—or in other words the inverse of the pulse repetition frequency—is indicated by T.)

The first pulse h(t) in FIG. 3A on the left results in a first pulse g(t) in FIG. 3A on the left. The forward filter 1 and the feedback filter 6 are dimensioned such that from the instant $t=\tau$ onwards the first pulse g(t) is identical to the first pulse h(t). Subtracting the pulse g(t) from the pulse h(t) provides a signal equalling the pulse h(t) from its beginning at $t=0$ to the instant $t=\tau$; this is the output signal d(t) of difference former 2 shown in FIG. 3B, in which the third set of subtracted pulses (h(t)−g(t)) is the most illustrative.

As an example, FIG. 3A relates to a case in which the bit interval T is smaller than the time interval $0-\tau$, the instant $t=\tau$ being the instant from where the respective pulse responses h(t) and g(t) of the forward filter 1 and the feedback filter 6 are equal. Consequently, in the above case there will be pulse interference (or to put it differently: intersymbol interference) if pulses are present in consecutive bit intervals of length T, like the first two and the last three pulses in the pulse signal 110100111.

Figure 3B:
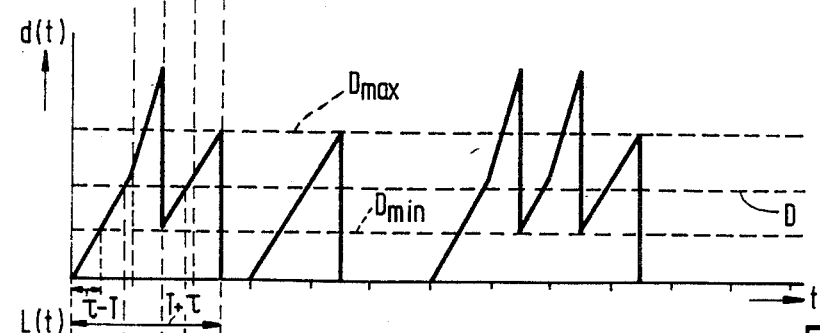

By means of limiter 3 this interference can be cancelled if the threshold value D of limiter 3 is smaller than the amplitude of the response h(t) of the forward filter 1 to a signal pulse at the instant $\tau$ from where the respective pulse responses h(t) and g(t) of the forward filter 1 and the feedback filter 6 are equal and if this threshold value D is larger than the amplitude of the response h(t) of the forward filter 1 to a signal pulse at the instant $(\tau-T)$ preceding the aforesaid instant $t=\tau$ by a time interval equal to the inverse of the pulse repetition frequency. Needless to observe that this only holds in case there is pulse interference, that is to say in case the aforesaid instant $(\tau-T)$ lies after the beginning of the signal pulse response h(t) of the forward filter at $t=0$. In any case the threshold value D of the limiter 3 should exceed zero. FIG. 3B shows the maximum and minimum values of the threshold D of the limiter 3 indicated by $D_{max}$ and $D_{min}$, respectively.

Figure 3C:
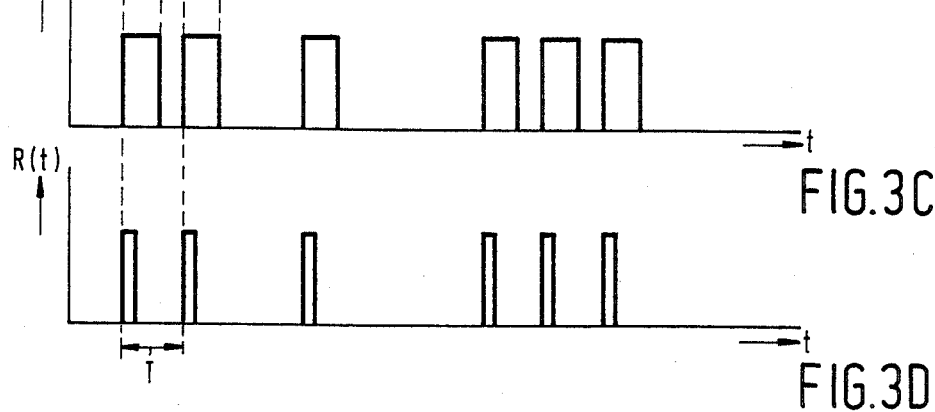
Figure 3D:
Figure 4:
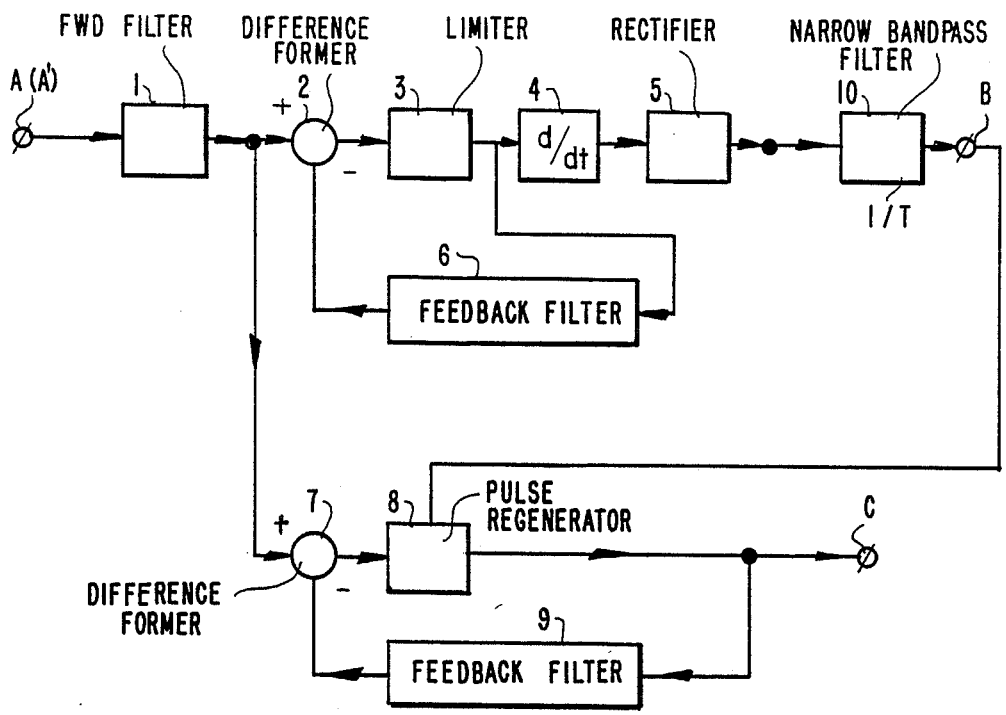
FIG. 4 shows an alternate embodiment to FIG. 1, in which the feedback filter 6 is coupled to the output of the limiter 3.

The output signal L(t) of the limiter 3 is represented in FIG. 3C and FIG. 3D represents the output signal R(t) of the rectifier 5. In other words FIG. 3D shows the positive parts of the differentiated pulses of FIG. 3C.

The output signal R(t) of the rectifier 5 shown in FIG. 3D can be used for direct recovery of the clock after being filtered by the narrow bandpass filter 10 turned to the pulse repetition frequency 1/T (and preferably implemented as a phase-locked loop (PLL) because the power density spectrum of a random sequence of pulses of the return-to-zero type has a line at the pulse repetition frequency. The output sgnal L(t) of the limiter 3 shown in FIG. 3C can possibly be regarded as regenerated pulses, that is, signal pulses. However, the problem is that in the case of noisy pulse transmission channels these signal pulses exhibit a considerable amount of jitter, because the instant of crossing the threshold value D of the limiter 3 is effected by noise and a small amount of intersymbol interference and, consequently, clocking these signal pulses with generated clock pulses is useful. As a result of the jitter, the compensation by the quantized feedback per pulse is not entirely ideal and on that account the use of an additional pulse regenerator 8 remains preferable.

Figure 2:
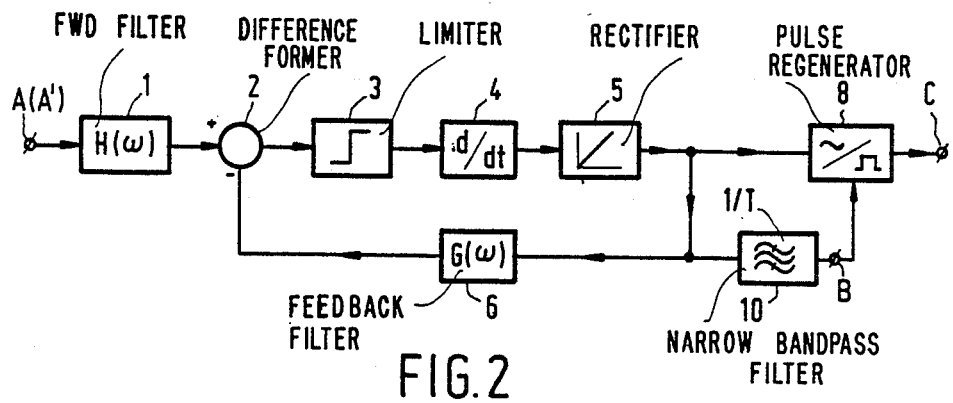
FIG. 2 likewise shows a block diagram of a pulse repeater comprising a clock generator according to the invention, but modified such that no decision feedback loop is required in the pulse signal regenerator.

FIG. 2 shows a further optional combination of clock regeneration and pulse regeneration. The elements in FIG. 2 corresponding with elements in FIG. 1 have the same reference numbers. The clock generator in FIG. 2 is identical to the one in FIG. 1. The pulse signal regenerator, though, only comprises pulse regenerator 8, whose signal input is connected to the output of rectifier 5 and whose clock input is connected to the output B of the clock pulse regenerator 1-6, 10. Therefore, in the pulse signal regenerator (8) there is no decision feedback, so that difference former 7 and feedback filter 9 of FIG. 1 are absent in FIG. 2. The pulse repeater according to FIG. 2 has the important advantage that the time delay in the feedback loop is smaller by an amount of at least half the time delay in the conventional decision feedback regeneration, in which use is made of a sampling clocked decision switch. Consequently, the pulse repeater according to FIG. 2 can be used in high-speed pulse transmission systems, for example in a so-called hybrid pulse transmission system (in which a plurality of analog line amplifiers are included between two consecutive pulse repeaters) operating at a bit rate of 560 Mbit/s. The disadvantage, though, is that there is a greater chance of erroneous decisions being taken.

As stated before, the clock regenerator 1-6, 10 can advantageously be used in applications employing quantized feedback (decision feedback) at the output of strongly non-linear channels like in digital magnetic recording.

What is claimed is:

1. A clock generator for a pulse repeater of a receiver in a pulse transmission system having a signal pulse repetition frequency, comprising:
   (a) an input;
   (b) a forward filter, having an input coupled with the input of the clock generator, an output, and a signal pulse response having an amplitude;
   (c) means for forming a difference having a positive input coupled with the output of the forward filter, a negative input, and an output;
   (d) an output;
   (e) a feedback filter having an input and an output, coupled with the negative input of the difference forming means, the feedback filter having a signal pulse response having an amplitude; and
   (f) a series arrangement coupled between the output of the difference forming means and the output of the clock generator, the arrangement comprising, in the following order:
      (i) a limiter having an output couple with the input of the feedback filter and an absolute threshold value smaller than the amplitude of the signal pulse response of the forward filter at a first instant from which the signal pulse responses of the forward and feedback filters are equal, the absolute threshold value of the limiter also being larger than the amplitude of the signal pulse response of the forward filter at a second instant preceding the first instant by a time interval equal to the inverse of the signal pulse repetition frequency if the first instant lies after a beginning of a signal pulse response of the forwar filter, the absolute threshold value of the limiter also being greater than zero;
      (ii) a time differentiator;
      (iii) a rectifier; and
      (iv) a bandpass filter.

2. A clock generator for a pulse repeater of a receiver in a pulse transmission system having a signal pulse repetition frequency, comprising:
   (a) an input;
   (b) a forward filter, having an input coupled with the input of the clock generator, an output, and a signal pulse response having an amplitude;
   (c) means for forming a difference having a positive input coupled with the output of the forward filter, a negative input, and an output;
   (d) an output;
   (e) a feedback filter having an input and an output, coupled with the negative input of the difference forming means, the feedback filter having a signal pulse response having an amplitude; and
   (f) a series arrangement coupled between the output of the difference forming means and the output of the clock generator, the arrangement comprising, in the following order:
      (i) a limiter having an absolute threshold value smaller than the amplitude of the signal pulse response of the forward filter at a first instant from which the signal pulse responses of the forward and feedback filters are equal, the absolute threshold value of the limiter also being larger than the amplitude of the signal pulse response of the forward filter at a second instant preceding the first instant by a time interval equal to the inverse of the signal pulse repetition frequency if the first instant lies after a beginning of a signal pulse response of the forward filter, the absolute threshold value of the limiter also being greater than zero;
      (ii) a time differentiator;
      (iii) a rectifier having an output coupled with the input of the feedback filter; and
      (iv) a bandpass filter.

3. A pulse repeater, for a receiver in a pulse transmission system having a signal pulse repetition frequency, the pulse repeater comprising:
   (a) a clock generator comprising:
      (i) an input;
      (ii) a forward filter, having an input coupled with the input of the clock generator, an output, and a signal pulse response having an amplitude;
      (iii) first means for forming a difference having a positive input coupled with the output of the forward filter, a negative input, and an output;
      (iv) an output;
      (v) a first feedback filter having an input and an output, coupled with the negative input of the first difference forming means, the first feedback filter having a signal pulse response having an amplitude; and
      (vi) a series arrangement coupled between the output of the first difference forming means and the output of the clock generator, the arrangement comprising, in the following order:
         (A) a limiter having an output coupled with the input of the first feedback filter and an absolute threshold value smaller than the amplitude of the signal pulse response of the forward filter at a first instant from which the signal pulse responses of the forward and first feedback filters are equal, the absolute threshold value of the limiter also being larger than the amplitude of the signal pulse response of the forward filter at a second instant preceding the first instant by a time interval equal to the inverse of the signal pulse repetition frequency if the first instant lies after a beginning of a signal pulse response of the forward filter, the absolute threshold value of the limiter also being greater than zero;
(B) a time differentiator;
(C) a rectifier; and
(D) a bandpass filter; and
(b) a pulse signal regenerator, comprising:
(i) an input;
(ii) second means for forming a difference having a positive input, coupled with the output of the forward filter, a negative input, and an output;
(iii) an output
(iv) a pulse regenerator, coupled between the output of the second difference forming means and the output of the pulse signal regenerator, the pulse regenerator having a clock input, coupled with the output of the clock generator; and
(v) a second feedback filter coupled between an output of the pulse regenerator and the negative input of the second difference forming means.

4. The pulse repeater of claim 3 wherein the first and second feedback filters have substantially the same amplitude and frequency characteristics.

5. The pulse repeater of claim 3 wherein:
(a) the forward filter comprises a first forward filter, coupled between the input of the clock generator and the positive input of the first difference forming means, and a second forward filter coupled before the positive input of the second difference forming means, the first and second forward filters having distinct amplitude and frequency characteristics; and
(b) the first and second feedback filters have distinct amplitude and frequency characteristics.

6. A pulse repeater, for a receiver in a pulse transmission system having a signal pulse repetition frequency, the pulse repeater comprising:
(a) a clock generator comprising:
(i) an input;
(ii) a forward filter, having an input coupled with the input of the clock generator, an output, and a signal pulse response having an amplitude;
(iii) means for forming a difference having a positive input coupled with the output of the forward filter, a negative input, and an output;
(iv) an output;
(v) a first feedback filter having an input and an output coupled with the negative input of the difference forming means, the first feedback filter having a signal pulse response having an amplitude; and
(vi) a series arrangement coupled between the output of the difference forming means and the output of the clock generator, the arrangement comprising, in the following order:
(A) a limiter having an absolute threshold value smaller than the amplitude of the signal pulse response of the forward filter at a first instant from which the signal pulse responses of the forward and first feedback filters are equal, the absolute threshold value of the limiter also being larger than the amplitude of the signal pulse response of the forward filter at a second instant preceding the first instant by a time interval equal to the inverse of the signal pulse repetition frequency if the first instant lies after a beginning of a signal pulse response of the forward filter, the absolute threshold value of the limiter also being greater than zero;
(B) a time differentiator;
(C) a rectifier having an output coupled with the input of the first feedback filter; and
(D) a bandpass filter; and
(b) a pulse signal regenerator, comprising:
(i) an input;
(ii) second means for forming a difference having a positive input, coupled with the output of the forward filter, a negative input, and an output;
(iii) an output
(iv) a pulse regenerator, coupled between the output of the second difference forming means and the output of the pulse signal regenerator, having a clock input, coupled with the output of the clock generator;
(v) a second feedback filter coupled between an output of the pulse regenerator and the negative input of the second difference forming means.

7. The pulse repeater of claim 6 wherein the first and second feedback filters have substantially the same amplitud and frequency characteristics.

8. The pulse repeater of claim 6 wherein:
(a) the forward filter comprises a first forward filter, coupled between the input of the clock generator and the positive input of the first difference forming means, and a second forward filter coupled before the positive input of the second difference forming means, the first and second forward filters having distinct amplitude and frequency characteristics; and
(b) the first and second feedback filters have distinct amplitude and frequency characteristics.

9. A pulse repeater, for a receiver in a pulse transmission system having a signal pulse repetition frequency, the pulse repeater comprising:
(a) a clock generator comprising:
(i) an input;
(ii) a forward filter, having an input coupled with the input of the clock generator, an output, and a signal pulse response having an amplitude;
(iii) means for forming a difference having a positive input coupled with the output of the forward filter, a negative input, and an output;
(iv) an output;
(v) a feedback filter having an input and an output, coupled with the negative input of the difference forming means, the feedback filter having a signal pulse response having an amplitude; and
(vi) a series arrangement coupled between the output of the difference forming means and the output of the clock generator, the arrangement comprising, in the following order:
(A) a limiter having an absolute threshold value smaller than the amplitude of the signal pulse response of the forward filter at a first instant from which the signal pulse responses of the forward and feedback filters are equal, the absolute threshold value of the limiter also being larger than the amplitude of the signal pulse response of the forward filter at a second instant preceding the first instant by a time interval equal to the inverse of the signal pulse repetition frequency if the first instant lies after a beginning of a signal pulse response of the forward filter, the absolute threshold value of the limiter also being greater than zero;
(B) a time differentiator;
(C) a rectifier having an output coupled with the input of the feedback filter; and
(D) a bandpass filter; and
(b) a pulse signal regenerator, including:
(i) an output; and
(ii) a pulse regenerator having a signal input, coupled with the output of the rectifier, a clock input, coupled with the output of the clock generator, and an output at the output of the pulse signal regenerator.

* * * * *